Dec. 24, 1957 A. R. MEYER 2,817,748
WELDING PROCESS
Filed July 12, 1954 2 Sheets-Sheet 2

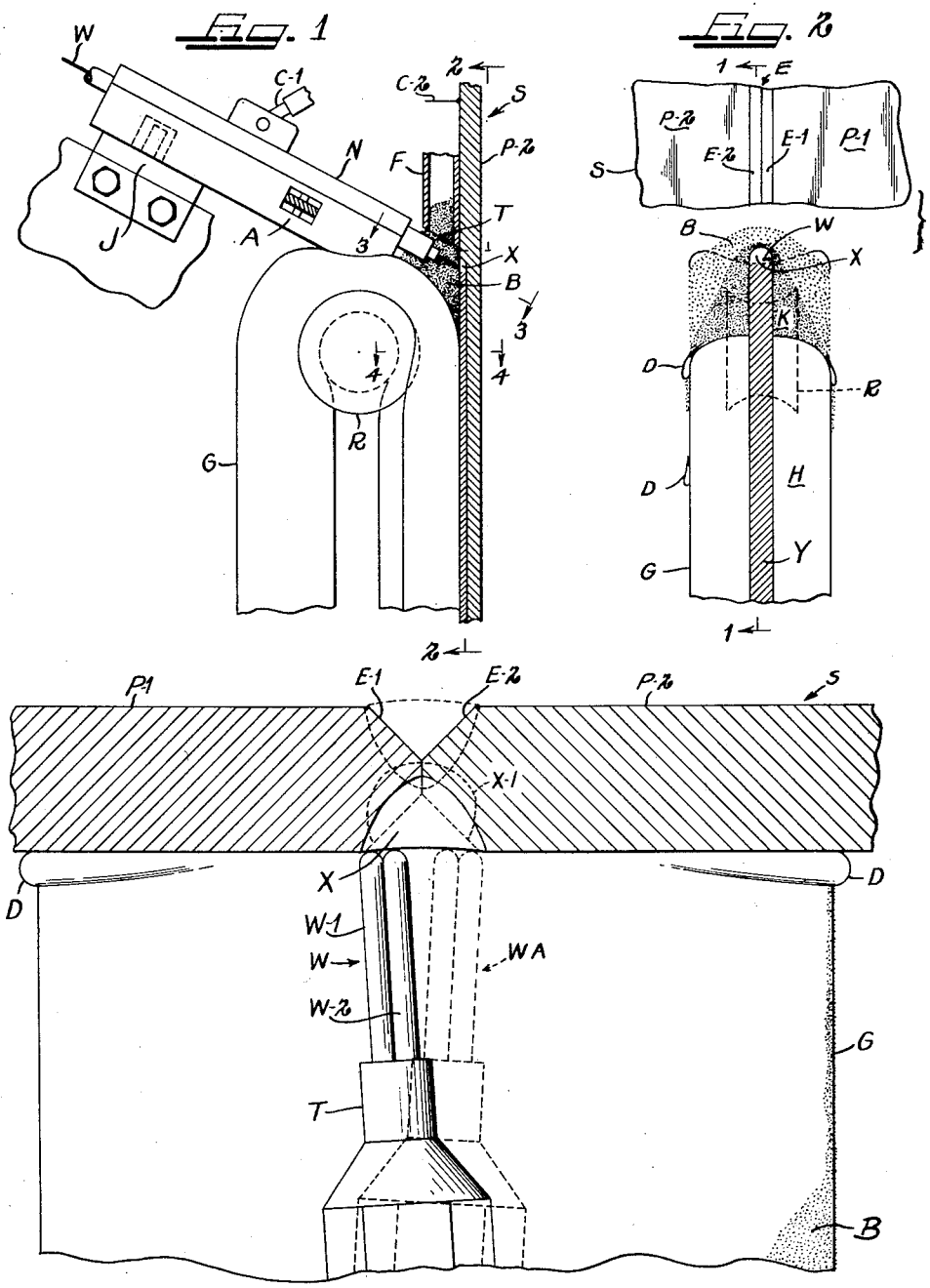

Inventor
AMEL R. MEYER
F. D. Prager
Atty.

United States Patent Office 2,817,748
Patented Dec. 24, 1957

2,817,748

WELDING PROCESS

Amel R. Meyer, Griffith, Ind., assignor to Graver Tank & Mfg. Co., Inc., East Chicago, Ind., a corporation of Delaware Application July 12, 1954, Serial No. 442,864

2 Claims. (Cl. 219—126)

Progress has been made in recent years towards the submerged arc welding of upright metal plates. For instance it was found that certain dangers of flux bed instability must be avoided, and how this can be done; also, how support can be given to the melt.

However, it was found that the high heat input and deep penetration characteristics of the submerged arc process could not be exploited in the manner and to the extent normal in flat downhand welding, because of problems inherent in the melt produced on upright surfaces. The problems included, among others, undercut of upper edges in horizontal welds, due to gravitational sagging, and overlap of lateral edges in vertical welds, due to pressure applied to avoid downward sagging.

Concentration of welding heat improved these conditions. However, new dangers were encountered, involving excessive penetration, resulting poor congealing characteristics, and attendant formation of shrinkage cavities, sometimes called cracking. Conditions were aggravated by the use of welding current characteristics which had been considered as standard.

It has now been discovered that considerable improvement is possible by incorporating certain features, known by themselves but heretofore used in welding processes widely distinguished from the submerged arc welding of upright plates. These novel features of the present type of process counteract excessive weld penetration and attendant dangers, while not interfering with desirably high heat input and required heat concentration. They do so by applying the high and concentrated welding heat very largely to the side areas of the welding zone, as distinguished from the longitudinal center area of the welding zone. This in turn can be done by treating the upright plate with a submerged arc having a flat cross-section, oriented crosswise of the center line, and/or by weaving the submerged arc across the center line as it travels along the upright plate. Both expedients add to the melting and fusion of side portions of the seam, in spite of the concentration of the high welding heat.

Accordingly it is a primary object of this invention to provide welding methods and means for use along the edges of upright metal plates, involving the two basic steps of (1) covering a length of an edge area extending along the edges with a bed of loose flux, this flux being held temporarily stationary relative to the plates, and (2) directing heat, sufficient for melting and fusing portions of the metal and flux, to successive portions of the edge area lying largely along the sides of the edge area.

A particular object is, so to arrange in a simple, safe, inexpensive manner, by basically known plural-electrode and/or weaving electrode procedures. Another particular object is, by such provisions to improve the effectiveness of horizontal and vertical welding procedures, developed in recent times. Still another object is, to combine the processes mentioned with the use of welding current characteristics contributing further to overall economy and efficiency.

In the drawing:

Figure 1 is a diagrammatic side view of a vertical welding zone and tool in accordance herewith.

Figures 2, 3 and 4 are views taken respectively along the correspondingly numbered lines in Figure 1; Figures 3 and 4 being enlarged.

Figure 4:
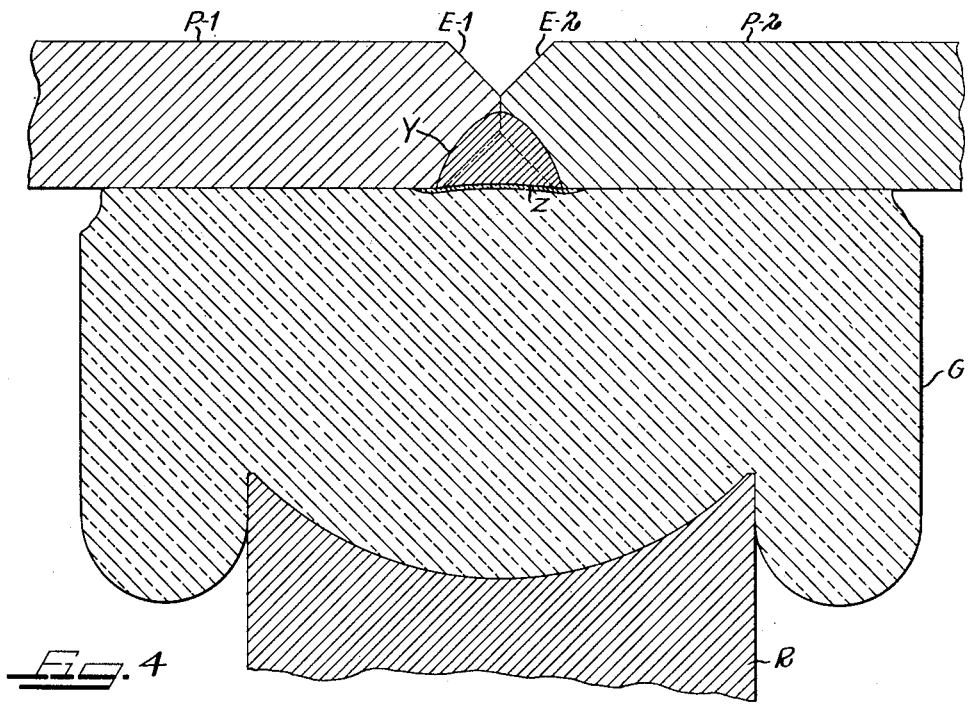

Referring first to Figures 1 and 2: A welding arc X is maintained in an edge area E, extending along edge portions E–1, E–2 of plates P–1, P–2 of an upright shell S. The shell can be assumed to be stationary. The edges are shown as being vertical.

Welding electrode means W are directed to the edges and supplied with proper welding current by a welding nozzle N. The current is brought to the nozzle and shell by conductors C–1, C–2 respectively. Loose flux is supplied to the welding zone surrounding the arc X by a flux chute F discharging in the immediate vicinity of the tip T of the electrode nozzle. A bed B of the flux so supplied is supported around the welding zone and kept stationary relatively thereto by a resiliently compressible, partly compressed, refractory belt G of loosely felted glass wool or the like. This belt is rolled onto the welding zone by a roller R. The roller R and the electrode and flux nozzles N, F travel together over the edge area E.

In Figure 2 the area H is the front surface of the belt G, pressed against the shell S to support the melt formed by the arc X. The letter K designates the front surface of the flux bed B, in contact with the shell S and surrounding the welding zone. Because of the rolling application of the belt G, the front surface H and the flux portion K thereon are stationary with respect to the shell X, except that their upper and lower limits are subject to continuous change. The top of the flux portion K rises as the rising flux nozzle F deposits new amounts of flux on the bed B; and the division between the areas K and H rises as new portions of belt G are rolled onto the plate S, there being of course some interception of flux between the belt and the plate.

In the center of the area K, at the arc X, both shell and electrode metal and flux are molten. The molten and fused metals form a weld bead Y. A small part of the molten flux is retained as an envelope Z around this weld bead Y, between the same and the belt G (see Figure 4). Larger parts of the molten flux are upwardly and laterally displaced from the welding zone as flows or drops D, by the rolling on of the belt G. These drops run off over the top and sides of the belt G, mixed with some of the cold and dry flux which escapes around the stationary bed core K.

These expedients insure the proper performance of the first basic step required; submersion of the arc X under a bed B of loose flux which covers a suitable, short length of the edge area E and is held temporarily stationary—in spite of the running off of superficial flux portions—by the belt B. More particularly the flux bed is vented of molten flux, as was found necessary for successful vertical welding.

The second basic step, involving substantial melting and fusion of side portions of the seam, will now be described. In Figure 2 the welding electrode means W is diagrammatically shown in form of two dots, horizontally aligned close together, and disposed slightly to one side of the arc zone X. The electrode nozzle N (Figure 1) is shown as pivoted for oscillating motions in a flat plane, about a journal J. Attachment means A are provided for motorized linkage, not shown, whereby such oscillations can be maintained.

Figure 5:
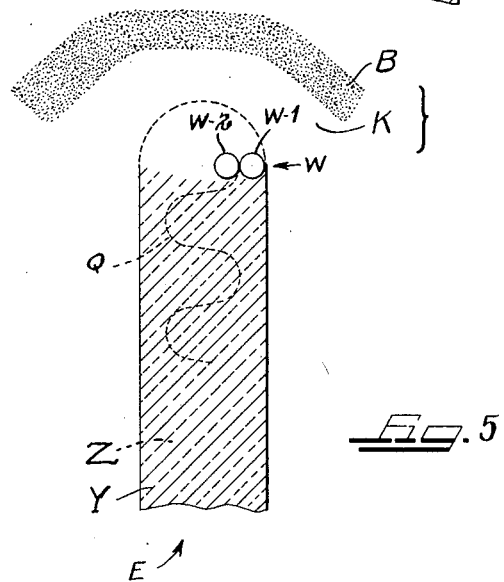
Figure 5 is an enlarged detail from Figure 2.

Referring to Figures 3, 4 and 5 it will be seen that the welding electrode means W preferably consists in a pair of electrode wires W–1, W–2 lying in a flat plane and contacting one another lengthwise. In substance, such pair or plurality of wires forms a flat electrode by the use of inexpensive, standard electrode wires. This expedient causes application of relatively large portions of the welding heat to the exposed or outer portions or side areas of the crater or arc zone X, while at the same time allowing concentration of the heat input upon a small length and area of the edge area E.

If only a single electrode were used, as heretofore in this kind of method, and if it had a circular cross-sectional area equal to the combined areas of the electrodes W–1, W–2, the submerged arc would be concentrated along the center line of the edge area and would tend to penetrate deeply into the plates, while burning off only narrow edge portions. This would create the danger that the resulting weld nugget X–1 becomes deep and narrow; in some cases this nugget would even expand inwardly under the plate. This in turn would create the danger that the weld deposit freezes from the outside inwards, thereby forming shrinkage cavities and seriously impairing the soundness of the weld. This danger is greatly reduced by the use of the double electrodes as described, thereby facilitating the safe application of high, longitudinally concentrated welding heat.

It will further be seen that the oscillations, applied to the electrode nozzle, bring the electrode means alternately into positions W, WA adjacent the sides of the edge area, thereby further contributing to a relatively greater burn-off rate of the sides and the creation of a melt deposit having a wide front or exposed surface and desirably converging outline inwardly therefrom to a narrow root.

The path Q of the arc X or electrode means W, along the edge area E, can thus be visualized as a wave line more or less in form of a sinusoidal curve extending generally along said edge area but crossing the same cyclically. The exact form of the curve Q most suitable for present purposes generally involves considerable "dwell" on the side or turning portions of the path, which account for at least about half of the overall length of the path. That is, these side or turning portions should be formed as flat, slightly curved lines, not as pointed zigzags. The mechanical linkage attached at A can produce this effect without difficulty.

The curve Q differs in several respects from the weaving curves used in conventional welding methods. The closest parallel probably is the manual, unsubmerged welding of vertical seams. The different features of that process can be compared with those of the new process as follows:

| Old | New |
|---|---|
| Manual. | Manual or Automatic. |
| Unsubmerged. | Submerged. |
| Low Current Density. | High Current Density. |
| High Total Heat Input. | Low Total Heat Input. |
| Wide Oscillations. | Narrow Oscillations. |
| Thick Electrode. | Thin Electrodes. |
| One Electrode. | Two Electrodes. |
| Many Passes. | Few Passes. |
| Low Travel Speed. | Rapid Travel Speed. |

As a typical example, the two processes can be compared as follows when applied in vertically butt welding ½ inch thick mild steel plate:

| | Old | New |
|---|---|---|
| Total Heat Input, Joules/inch | 140,000 to 170,000 | 90,000. |
| Oscill. Width, Center to Center | 5/16 to 7/16 | ⅛ to 5/32". |
| Number of Oscillations per inch | 6 to 10 | 3 to 4. |
| Typical Electrode Thickness | 5/32" | 3/32". |
| Number of Electrodes | 1 | 2. |
| Number of Weld Passes | 4 to 6 Consec. | 2 Consecutive or Simultaneous. |
| Effective Travel Speed, in./min | 1.2 to 1.5 | 6 to 7 or 12 to 14. |

Thus a tremendous speed increase is obtained at relatively insignificant expense for extra materials and equipment. The labor cost is decreased even more than the travel time, since perfect welds, both horizontal and vertical, can now be produced by persons who only need to be skilled in the operation of relatively simple instruments and who need not have the special and rare dexterity of highly skilled welders.

The main advantage of the new process over the earlier, automatic processes for upright plates lies in the fact that the aforementioned dangers of undercut, overlap, shrinkage cavities, etc. are avoided.

Another significant advantage of the new process relates to the fact that it allows very free and very effective selection of welding current characteristics.

Particularly useful, as to simplicity of instrumentation and supervision, is the current known as constant voltage direct current. It allows the use of constant speed electrode feed. It avoids difficulties due to variable self-induction in cables and the like; and it provides a substantially extinction-proof arc.

Alternating currents can also be used to advantage, mainly where cable arrangements and attendant self-induction characteristics are constant; they have the advantage that no magnetic arc blow occurs.

A so-called standard direct current has also been used in vertical submerged arc welding. It provides a characteristic spreading out of the arc, which however is not laterally oriented as the present heat distribution; on the contrary it is directed in rather unpredictable ways because of magnetic and other influences. Therefore this last-mentioned current is believed to be generally the least desirable one of those under contemplation.

What is claimed is:

1. In a process for welding vertical abutting edges of upright, stationary metallic plates, wherein said edges are bevelled to form a trough; the steps of rolling a resiliently compressible refractory strip upwardly on the plates and in overlying relation to the edges, depositing a bed of flux on the strip so as to cover the plate edges and provide a zone in the flux bed which is held temporarily stationary relative to the plates and adjacent the trough, feeding welding wire means through the bed into the zone, moving the wire means upwardly in association with the rolling action of the strip, feeding welding heat through the wire means to the plate to form a molten pool in said trough and concurrently with the feeding of said welding heat and the vertical motion of said welding wire means oscillating the wire means transversely of said edges whereby a major portion of said welding heat is directed along the edges of said trough.

2. A process for welding according to claim 1, wherein said welding wire means comprises a plurality of electrode wires in immediately adjacent relation to each other.

References Cited in the file of this patent
UNITED STATES PATENTS

| 1,371,094 | Holslag | Mar. 8, 1921 |
| 1,441,688 | Jones | Jan. 9, 1923 |
| 1,873,847 | Miller | Aug. 23, 1932 |
| 1,933,340 | Raymond | Oct. 31, 1933 |
| 1,956,406 | Vars | Apr. 24, 1934 |
| 2,395,723 | Chmielewski | Feb. 26, 1946 |
| 2,654,015 | Landis | Sept. 29, 1953 |
| 2,673,916 | Meyer | Mar. 30, 1954 |
| 2,677,036 | Meyer | Apr. 27, 1954 |